United States Patent [19]

Masatomo

[11] Patent Number: 5,077,787
[45] Date of Patent: Dec. 31, 1991

[54] DATA COMMUNICATION APPARATUS

[75] Inventor: Masatomo Takahashi, Tokyo, Japan

[73] Assignee: Canon Kabushiki Kaisha, Tokyo, Japan

[21] Appl. No.: 627,913

[22] Filed: Dec. 17, 1990

Related U.S. Application Data

[63] Continuation of Ser. No. 339,694, Apr. 18, 1989, abandoned.

[30] Foreign Application Priority Data

Apr. 20, 1988 [JP] Japan .................................. 63-095786

[51] Int. Cl.⁵ .......................................... H04M 11/00
[52] U.S. Cl. ...................................... 379/100; 379/93; 358/407; 358/440
[58] Field of Search ..................... 358/402, 407, 440; 379/100, 93, 96-98

[56] References Cited

U.S. PATENT DOCUMENTS

| 4,208,714 | 6/1980 | Eklund et al. | 364/200 |
| 4,390,944 | 6/1983 | Quackenbush et al. | 364/200 |
| 4,441,163 | 4/1984 | Leikam et al. | 364/900 |
| 4,754,335 | 6/1988 | Zzawa et al. | 379/100 |

FOREIGN PATENT DOCUMENTS 0084061  5/1985  Japan .................................... 379/100

OTHER PUBLICATIONS

M. S. Piercy et al., "Autofax: A Store-and-Forward Facsimile System", *POEEJ*, vol. 71, Jan. 1979, pp. 266-269.

*Primary Examiner*—James L. Dwyer
*Assistant Examiner*—Wing F. Chan
*Attorney, Agent, or Firm*—Fitzpatrick, Cella, Harper & Scinto

[57] ABSTRACT

A data communication apparatus can reserve at least transmissions of first data and second data, and can effect transmission data of the second data before the completion of transmission of the first data. In a further development, the apparatus can effect transmission of the first data and transmission of the second data alternately to thereby execute multi-address transmission.

16 Claims, 5 Drawing Sheets

DATA COMMUNICATION APPARATUS

This application is a continuation of application Ser. No. 339,694 filed Apr. 18, 1989 now abandoned.

BACKGROUND OF THE INVENTION

1. Field of the Invention

The present invention relates to a data communication apparatus, particularly to a data communication apparatus capable of reserved data transmission.

2. Related Background Art

In such conventional apparatus, for example facsimile apparatus, it has been customary to transmit, in succession, the image data read from the originals, but, as the result of recent cost reduction of memory devices, there are being commercialized apparatus which is equipped with an image memory of a large capacity and is capable of transmitting the image data after reading and storing such image data.

Such method of image data transmission after storage in a memory enables so-called reserved transmission in which, even when preceding stored image data are in the course of transmission, next image data are read and stored together with the identification data, such as a telephone number, of the destination.

In such reserved transmission method utilizing an image memory, even in the course of a transmission requiring a longer time than for image reading, for example, transmission of the same image data to plural destinations, the operator can reserve transmission (image reading and registration of destination) without awaiting the completion of current transmission and remove the original documents from the apparatus.

FIG. 9 shows conventional transmission control in case of reserved transmissions to plural destinations. There is considered a case of transmitting the same image data to plural destinations at a designated time, and, more specifically, a case of sending image data A to two destinations a1, a2 and B to two destinations b1, b2.

As shown in the upper half of FIG. 9, the first destination station a1 is called, and, if it is busy, the next destination station a2 is called. In this manner there is conducted so-called redialling process in which the station a1 that was busy before is called again, after all the reserved destination stations (a1 and a2 in this case) have been called. Thus, in this control, the redialling to a busy station is postponed to the last of same data transmission. After the completion of transmissions of the image data A, there are started transmissions of the image data B as shown in the lower part of FIG. 9.

However, such control method results in an inconvenience in case a destination station is busy.

In the conventional redialling process, if a destination station is busy, the redialling is made a predetermined number of times at a predetermined interval measured only with a timer. Such redialling process is acceptable when the read image data are transmitted in succession in the order of image data reading, but gives rise to following drawback if it is applied to reserved transmission method utilizing an image memory.

For example, during the redialling period to the station a1 shown in FIG. 9, the call is merely tried repeatedly but data transmission is not made. Consequently the transmission of the image data B is accordingly delayed, and the efficiency of use of the communication channel is lowered.

In order to solve this problem it is possible to start the transmissions of the image data B while one of the destinations of the image data A is in the redialling period, but such control will delay the completion of transmissions of the image data A if the amount of the image data B is large. Also such control will be inevitably complex and will result in a lowered efficiency of use of the image memory, since the memory area for the image data A cannot be evacuated. Data communication apparatus capable of data transmission utilizing a memory are already disclosed for example in U.S. Ser. Nos. 855,704 filed on Apr. 25, 1986, 755,361 filed on July 16, 1985, U.S. Pat. No. 4,772,955, U.S. Ser. Nos. 243,231 filed on May 26, 1986, 009,528 filed on Feb. 2, 1987, 155,083 filed on Feb. 11, 1988 and 798,316 filed on Nov. 15, 1985, but no solution to the above-mentioned drawback has been proposed.

SUMMARY OF THE INVENTION

In consideration of the foregoing, an object of the present invention is to provide an improvement on the data communication apparatus.

Another object of the present invention is to provide a data communication apparatus with reserved data transmission function, capable of automatically transmitting plural reserved data in an efficient order.

Still another object of the present invention is to enable efficient use of a communication channel and a memory for data storage.

Still another object of the present invention is, when plural data transmissions are reserved, to transmit said reserved data in an order according to the transmission conditions of said data.

Still another object of the present invention is, when plural data transmissions are reserved, to transmit said reserved data in an order of faster completion of transmissions.

Still other objects of the present invention, and the advantages thereof, will become fully apparent from the following description of the embodiments to be taken in conjunction with the attached drawings.

DETAILED DESCRIPTION OF THE PREFERRED EMBODIMENTS

Now the present invention will be clarified in detail by embodiments thereof shown in the attached drawings.

Figure 1:
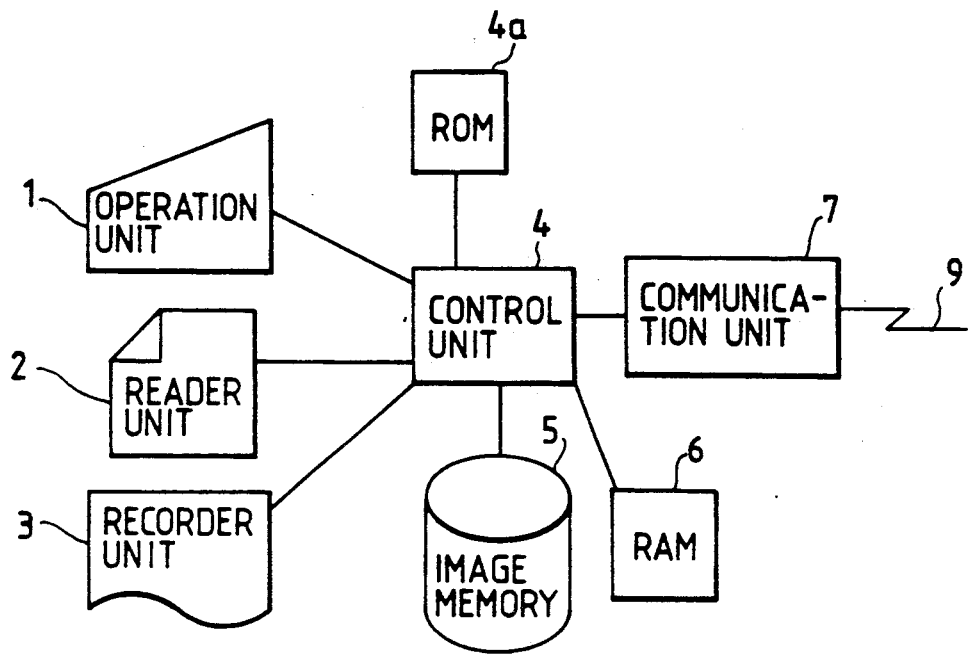
FIG. 1 is a block diagram of a facsimile apparatus embodying the present invention.

FIG. 1 illustrates a facsimile apparatus embodying the present invention, wherein a control unit 4, composed for example of a microprocessor, executes image communication through control of the following component units.

A communication unit 7 executes modulation and demodulation of sequence signals and image signals, and control of the communication channel, and is composed of a modem, an NCU etc. A communication channel 9 is connected to the apparatus through the communication unit 7. The facsimile communication may be made in an analog process such as G1-G3, or a digital process such as G4, according to the type of the channel 9.

The recording and reading of the image is conducted by a recording unit 3 and a reading unit 2. The recording unit 3 is composed for example of a thermal printer, while the reading unit 2 is composed of a CCD line sensor and an original document transport unit etc.

The operation of communication is controlled by an operation unit 1, which is composed of numeral keys for entering telephone numbers, a keyboard containing various functions keys, and a display unit for displaying telephone number, time etc.

The control unit 1 is connected to three memories 4a, 5, 6. A ROM 4a is used for the storage of control programs to be explained later. An image memory 5 of a large capacity, composed of a RAM or a magnetic disk, is used for the storage of image data for reserved transmission.

A RAM 6 is used as a work area for the image memory and the control unit 4, and for the storage of call information, such as the destination to which the image data are to be transmitted.

In the present embodiment, the reserved transmission is made possible by buffering of the image data in the image memory 5, as already explained in the conventional technology, as long as memory capacity is available in the image memory 5.

Referring to FIG. 1, when the apparatus is activated by designating the destination through the operation unit 1, the original image is read in the reading unit 2 and is stored in the image memory 5.

At the same time the information on the designated destination is stored in the RAM 6.

Figure 2A:
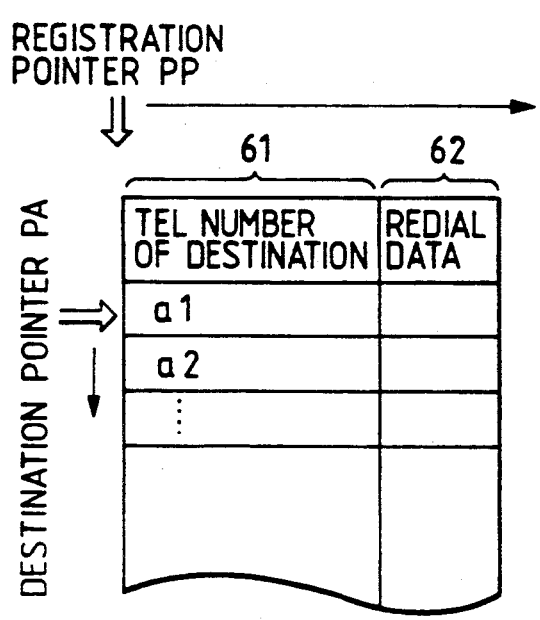
FIGS. 2A and 2B are views of a destination table defined in the RAM shown in FIG. 1.
Figure 2B:
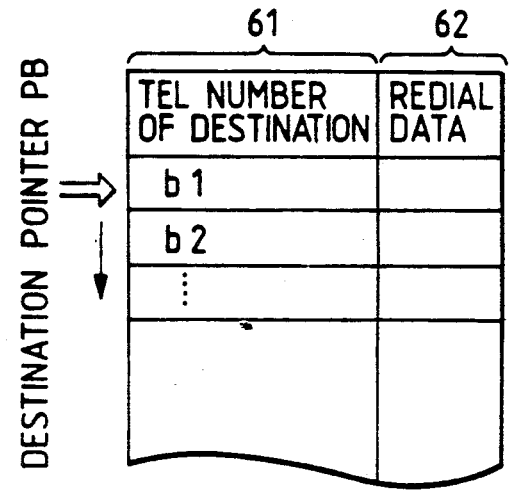

When transmissions are reserved for the image data A, B, ..., a destination table is formed in the RAM 6 as shown in FIG. 2. The field shown in FIG. 2 is composed of fields 61, 62 for respectively storing telephone numbers (in case of analog channels) as the identification data of destination stations to which image data are to be transmitted, and redialling information for use in the control to be explained later. Transmissions of same data are achieved by designating plural destination stations. Destination tables A, B, ... respectively corresponding to image data A, B, ... are designated by a registration pointer PP, and each destination in each table is designated by a destination pointers PA, PB, ..

In the foregoing there is explained a case of reserving transmissions for the image data A and B, but, in case of reserved transmissions for three or more image data, there are formed corresponding tables C, D, ... The registration pointer PP indicates the destination tables A, B, ... in succession, and designates the first table after designating the registered last one.

Figure 3:
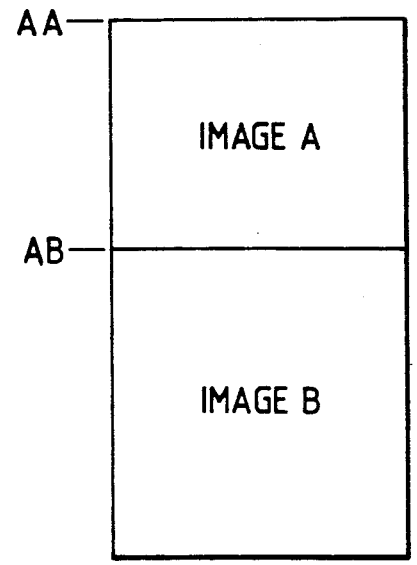
FIG. 3 is a view showing the state of storage of an image memory.

FIG. 3 shows the state of the image memory 5 after reservation of transmissions of the image data A and B. The image data A, B are respectively stored from addresses AA, AB of the image memory 5, and these addresses are memorized by an unrepresented field of the destination table explained above.

Figure 4A:
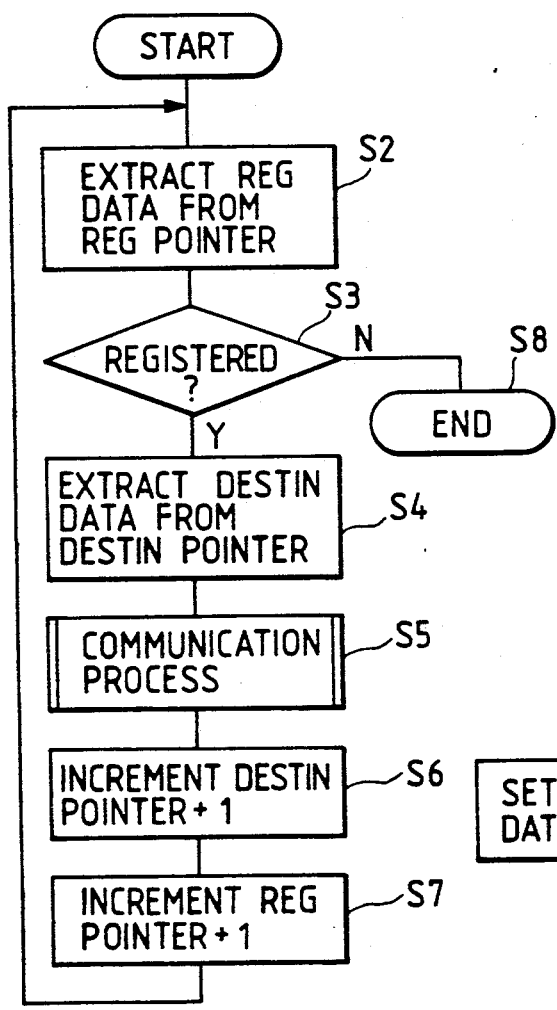
FIGS. 4A and 4B are flow charts showing the communication control sequence of said embodiment.
Figure 4B:
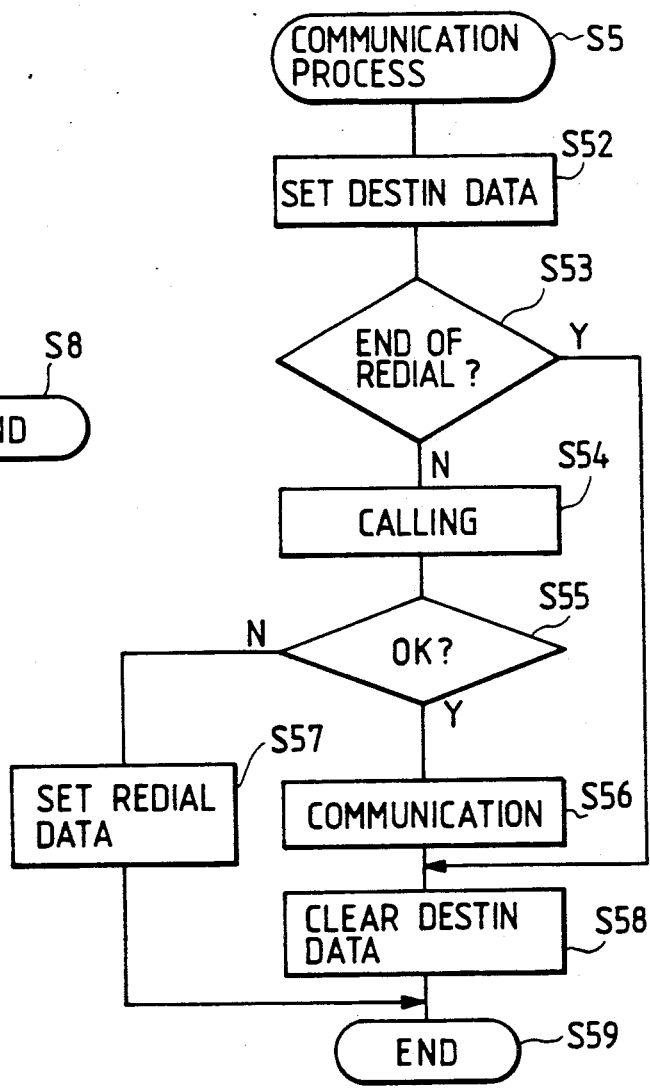

In the following there will be explained the function of the above-explained embodiment. FIGS. 4A and 4B are transmission control sequences stored in the ROM 4a, of the control unit 4.

When the start of transmission is instructed through the operation unit 1 after the reservation of the transmission, the registration pointer PP and the destination pointers PA, PB are initialized. Then a step S2 in FIG. 4A makes access to a predetermined area of the RAM 6 by means of the registration pointer PP, thus extracted the registered data.

Then a step S3 discriminates whether the extracted data indicate the presence of registration, and, if absent (in case of absence of reversed transmission), the sequence is terminated in a step S8.

On the other hand, in the presence of registration, the sequence proceeds to a step S4 to extract the destination data (telephone number) indicated by the destination pointer PA, and a step S5 starts communication, indicated in FIG. 4B as will be explained later. After the completion of communication, a step S6 advances the address pointer by one step, then a step S7 advances the registration pointer PP by a step, and the sequence returns to the step S2.

In the sequence of step S5 shown in FIG. 4B, a step S52 sends the destination data to an automatic call circuit of the communication unit 7, and a step S53 discriminates whether redialling has been already conducted, by referring to the redialling information of the field 62 of the destination table shown in FIG. 2. The sequence proceeds to a step S58 if the redialling is not necessary or has been completed, or to a step S54 if the redialling has not been completed.

The step S54 calls the destination station through the communication unit 7, and a step S55 discriminates whether the destination station is busy. The sequence then proceeds to a step S56 if the destination station is not busy, or to a step S57 for redialling operation if said station is busy.

The step S56 executes the transmission of the image data in the same manner as in the conventional technology. Thus the image data stored in the image memory 5 are transmitted in sequential manner. On the other hand, if the destination station is busy, the step S57 sets predetermined information indicating redialling in the field 62 shown in FIG. 2.

After the communication in the step S56, a step S58 deletes the data of the destination station, with which the communication has been made, from the destination table, and the sequence is terminated.

As will be apparent from the processes of the steps S6 and S7 in the above-explained sequence, the destination pointer and the registration pointer are advanced stepwise after every loop shown in FIG. 4A. In case the image data A and B are registered as shown in FIG. 2, the registration pointer designates said data in a sequence of A, B, A, ...

Thus, when the image data A and B are registered, the destination table is formed as shown in FIG. 2, and the first call is made to the destination station al appearing at first in the table A. If said station is busy, the step S57 writes the information, indicating the necessity for redialling, in the field 62 of the destination table, and the steps S6 and S7 respectively advance the registration pointer PP and the destination pointer PA.

Figure 5:
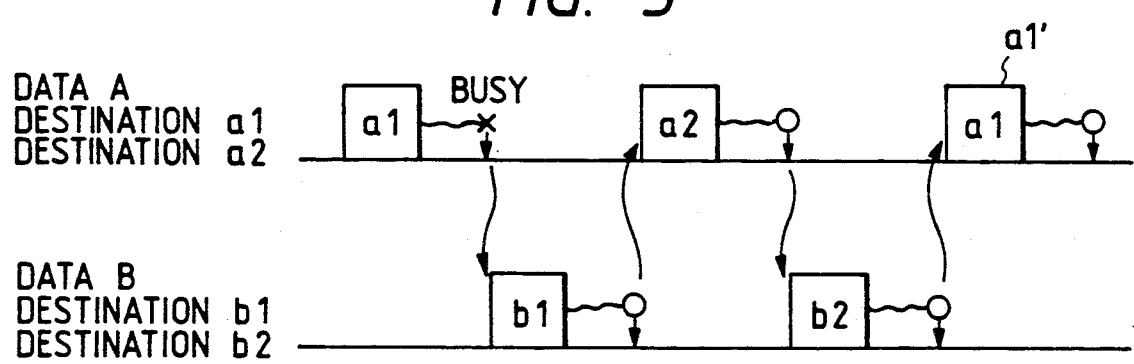
FIG. 5 is a view showing the transmission control according to the sequences shown in FIGS. 4A and 4B.

Thus, as shown in the lower half of FIG. 5, the call is made to the destination b1 appearing first in the destination table B. Subsequently the image transmissions are made to the stations a2, b2 by the changes of the pointer as explained above, and the data of the stations of completed transmissions are deleted.

After the transmission to the station b2, the destination pointer PA indicates the first station a1 of the destination table A, so that the redialling is made to the station a1, as indicated by a1'.

In the above-explained procedure, the image data are not processed in the order of registration, but the registration pointer and the destination pointer are advanced stepwise at every loop of communication, so that it is possible to avoid delay in the processing of the image data, due to the processing of the preceding image data. It is therefore possible to prevent the drawback in the conventional technology to a certain extent, but a further optimized control can be achieved by adding information fields as shown in FIG. 6 and effecting a control shown in FIG. 7.

Figure 6A:
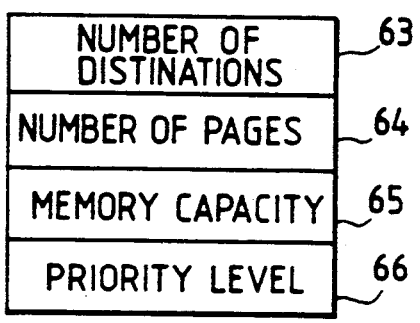
FIGS. 6A and 6B are views of a field attached to the destination table.
Figure 6B:
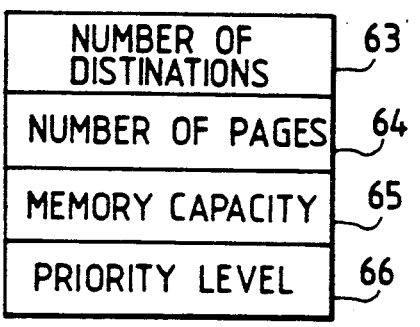

FIG. 6 shows information fields to be added respective to the destination tables A, B. In FIG. 6 there are shown a field 63 indicating the number of destination stations to which the image data are to be transmitted; a field 64 indicating the number of pages of the image data; a field 65 indicating the capacity of the image memory 5 occupied by said image data; and a field 66 indicating the preference level designated through the operation unit 1 at the registration. The preference level is designated by a numeral entered by the operator according to the urgency of the data to be transmitted, and a lowest preference level is automatically selected if a preference level is not designated by the operator.

Figure 7:
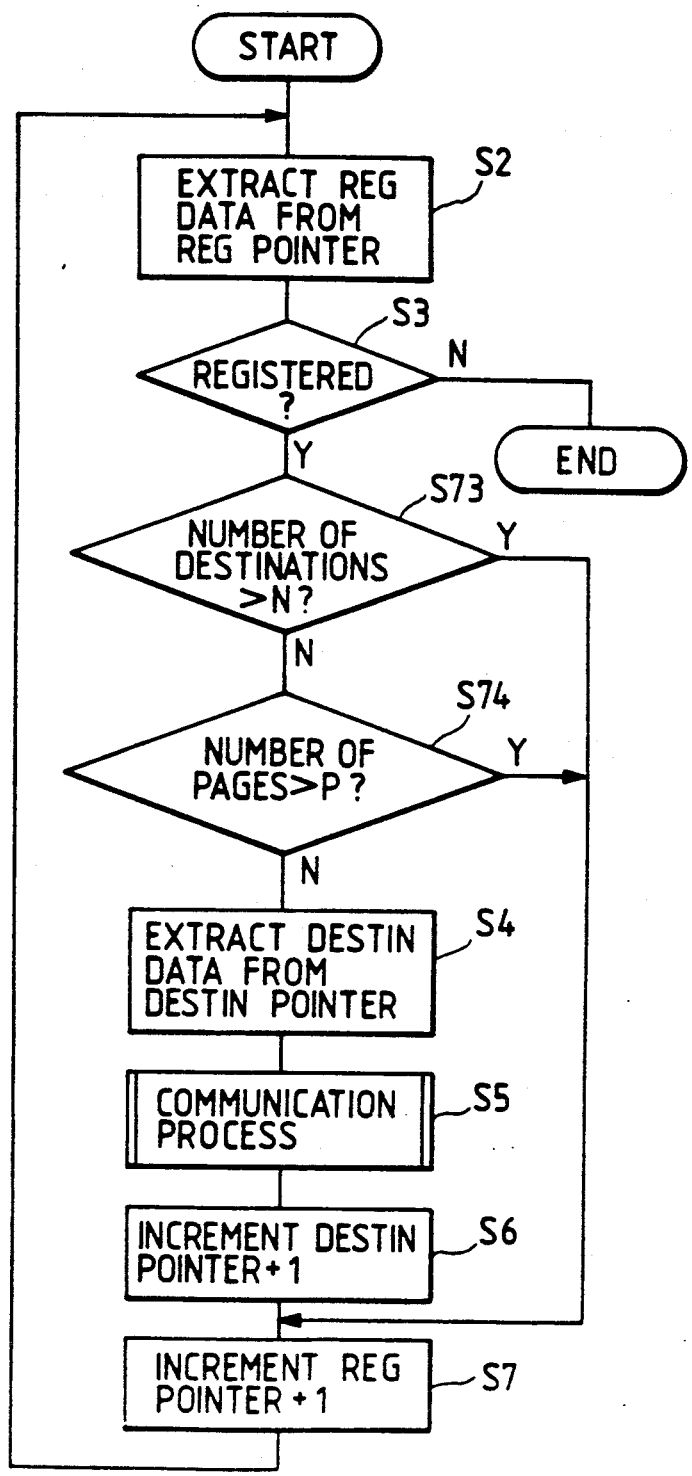
FIGS. 7, 8A and 8B are flow charts showing the control sequence utilizing the field shown in FIG. 6.

The sequence of transmissions is controlled for example as shown in FIG. 7, utilizing these additional data.

The control sequence shown in FIG. 7 is identical with that shown in FIG. 4A, except that steps S73 and S74 are added between the steps S3 and S4 shown in FIG. 4A. In the control sequence shown in FIG. 7, the order of transmissions is controlled according to the number of destination stations and the number of pages of the image data, stored in the fields 63, 64 shown in FIG. 6. When the step S3 identifies the presence of reserved transmissions, the sequence proceeds to the step S73 for discriminating whether the number of destinations, stored in the field 63, is larger than a predetermined number N. The sequence proceeds either to the step S7 if the result is affirmative, or to the step S74 if it is negative. The step S74 discriminates whether the number, stored in the field 64, of the pages of the image data exceeds a predetermined number P, and, if the result is affirmative, the sequence proceeds to the step S7. If the discriminations of the steps S73 and S74 turn out both negative, the sequence proceeds to the step S4 for extracting the destination data and thereafter executing the communication as explained before.

In the above-explained control, if the number of destinations is larger than a predetermined number or if the number of pages to be transmitted is larger than a predetermined number, the transmission to such destinations is postponed as the sequence proceeds to the step S7. Stated differently the image data of fewer destinations and fewer number of pages are transmitted earlier, so that the sequence can proceed to the transmission of next image data at the earliest possible timing. Also in the sequence shown in FIG. 7, the communication in the step S5 is controlled by a routine shown in FIG. 4B.

Figure 8A:
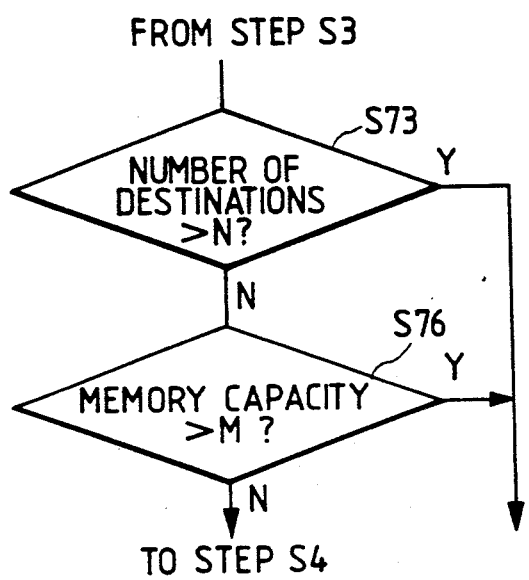

In the foregoing explanation the sequence of transmissions is controlled according to the number of destinations and the number of pages of the image data, but it is also possible to control the sequence of transmissions according to the number of destinations and the memory capacity occupied by the image data, indicated in the field 65 shown in FIG. 6. In this case, a process shown in FIG. 8A is used. In the steps S73, S74 shown in FIG. 7 are replaced by steps S73 and S76 shown in FIG. 8A. The step S73 is same as already explained in relation to FIG. 7, and the sequence proceeds to the step S7 or S76 respectively when the result of discrimination of the step S73 is affirmative or negative. The step S76 discriminates whether the memory capacity stored in the field 65 is larger than a predetermined number M, and the sequence proceeds to the step S7 or S4 respectively if said discrimination turns out affirmative or negative. In this case the transmissions are made, not in the increasing order of number of pages but in the increasing order of memory capacity.

Figure 8B:
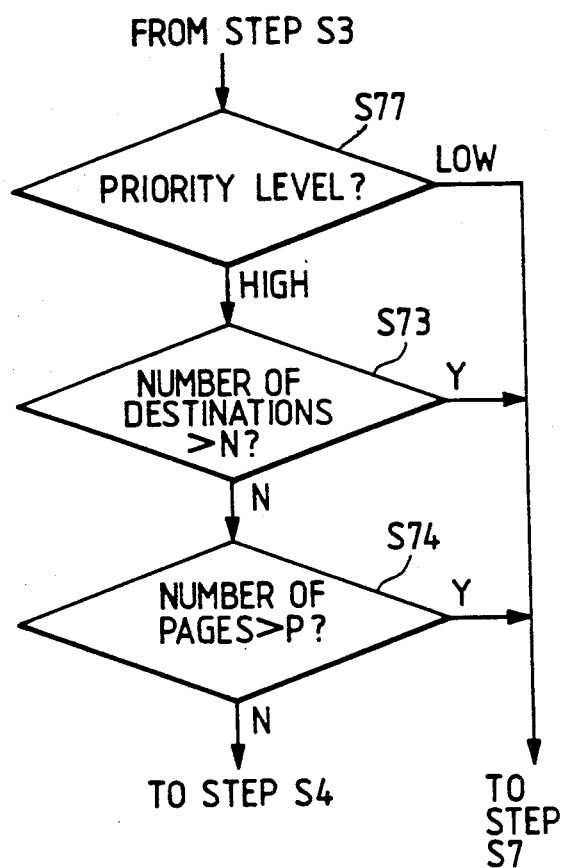
Figure 9:
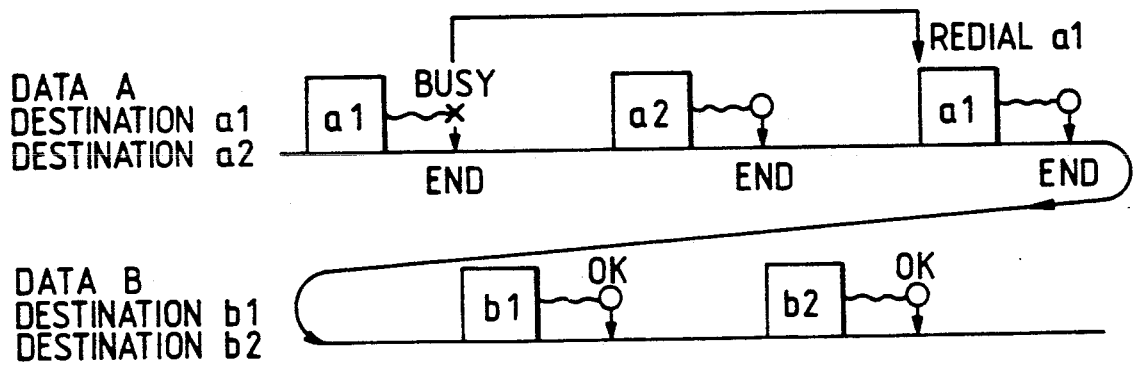
FIG. 9 is a view of a conventional image communication apparatus.

FIG. 8B shows a sequence in which the preference level is considered in addition to the number of destinations and the number of pages, as in case of FIG. 7. The sequence shown in FIG. 8 contains an additional step S77, inserted in front of the steps S73 and S74 shown in FIG. 7. In the sequence shown in FIG. 8B, the step S77 discriminates the preference level, stored in the field 66 shown in FIG. 6, prior to the step S73. More specifically the step S77 discriminates whether the transmission to the destination station is of a high preference or a low preference, and the sequence proceeds either to the step S7 or S73, respectively if the preference level is low or high. The steps S73 and S74 are same as those shown in FIG. 7. The discrimination of the step S77 can be attained, for example, by comparing the preference level of the current transmission is higher or lower than that of the preceding transmission.

The sequence shown in FIG. 8B enables transmissions in the descending order of preference levels, so that it is possible to avoid delay in urgent transmissions, caused for example by a busy state in less urgent transmissions.

In the foregoing embodiments the order of transmissions is determined according to the number of destinations, number of pages, magnitude of memory capacity, and preference level designated by the operator, but it is also possible to determine the order of transmissions according to other conditions. Also the combinations of the conditions can be taken arbitrarily. For example it is possible to effect the transmissions in the descending order of the memory capacities occupied by the image data, thereby improving the efficiency of utilization of the image memory area.

The foregoing description has been limited to the transmission of image data, but a similar control is applicable to the order of calls in a palling reception by automatic calling. In such case the number of pages and the memory capacity are naturally set at zero if the control is based on the number of pages or the memory capacity as shown in FIGS. 6 to 8.

As will be apparent from the foregoing embodiments, in an image communication apparatus which stores the image data together with the identification data of the destination stations and calls such destinations stations in a certain sequence based on stored data, there is provided control means for modifying the order of calls according to the conditions of communication and/or of the properties of said image data. It is therefore possible to call the destination stations in an optimum order according to the conditions of communication and the properties of the image data, thereby preventing the significant delay of a certain step, as encountered in the conventional control with fixed order of calls.

The foregoing embodiments have been limited to a facsimile apparatus, but the present invention is applicable to any data communication apparatus capable of reserved transmission of plural data, such as a teletex apparatus.

Also the present invention is not limited to the foregoing embodiments but is subject to various modifications.

I claim:

1. Data Communication Apparatus comprising:
   reserving means for reserving a plurality of data transmissions;
   transmission means for effecting data transmission;
   control means for selectively effecting the data transmissions reserved by said reserving means;
   wherein, when said reserving means reserves at least transmissions of first and second data different from each other, said control means effects the transmission of second data if a designation of transmission of the first data is busy, and then effects transmission of the first data after the completion of transmission of the second data.

2. An apparatus according to claim 1, wherein said reserving means comprises memory means for storing data and information on the destinations of transmissions of said data.

3. An apparatus according to claim 2, wherein said memory means is adapted to store the information of plural destinations for single data.

4. An apparatus according to claim 1, wherein said reserving means comprises means for setting the order of preference of the data to be transmitted.

5. An apparatus according to claim 4, wherein said setting means is manually set.

6. An apparatus according to claim 1, wherein said control means detects whether a destination of data transmission is busy or not, and effects the transmission of the second data when a destination of the transmission of the first data is busy.

7. An apparatus according to claim 1, further comprising first memory means storing therein information on a destination of the transmission of the first data, and second memory means storing therein information on a destination of the transmission of the second data, wherein said control means effects the transmissions of the first data and the second data in accordance with the information on destinations stored in said first and second memory means.

8. An apparatus according to claim 1, wherein said data are image data.

9. An apparatus according to claim 7, wherein said control means effects the transmission of the second data in accordance with the information stored in said second memory means when a destination of the transmission of the first data, stored in said first memory means, is busy.

10. A data transmission apparatus comprising:
    reserving means capable of reserving at least transmission of first data and transmission of second data;
    memory means for storing information on transmissions of data reserved by said reserving means;
    transmission means for effecting data transmission; and
    control means for effecting data transmissions reserved by said reserving means;
    wherein said control means effects the transmission of the second data when a destination of transmission of the first data is busy.

11. An apparatus according to claim 10, wherein said memory means is adapted to store the information of plural destinations for single data.

12. An apparatus according to claim 10, wherein said reserving means comprises means for setting the order of preference of the data to be transmitted.

13. An apparatus according to claim 11, wherein when the transmission of the first data and the second data are reserved and plural destinations are stored for each of the transmissions of the first data and the second data, said control means effects the transmission of the first data and the transmission of the second data alternately.

14. An apparatus according to claim 10, further comprising data memory means for storing data of which transmission is reserved.

15. A data communication apparatus comprising:
    reserving means for reserving at least transmission of first data and transmission of second data, said reserving means including a memory for storing information of destinations corresponding to respective data of which transmissions are reserved;
    transmissions means for effecting data transmission; and
    control means adapted to effect data transmissions reserved by said reserving means;
    wherein, when the transmission of the first data and the second data are reserved and plural destinations are stored for each of the transmissions of the first data and the second data, said control means is adapted to transmit the first data to one of destinations of transmission of the first data, then transmit the second data to one of destinations of the transmission of the second data, and thereafter transmits the first data to another destination of transmission of the first data, thus effecting the transmission of the first data and the transmission of the second data alternately.

16. A data communication apparatus comprising:
    reserving means for reserving at least transmission of first data and transmission of second data, said reserving means including a memory for storing information on destinations corresponding to respective data of which transmissions are reserved;
    transmission means for effecting data transmission; and
    control means adapted to effect data transmissions reserved by said reserving means;
    wherein, when the transmissions of the first data and the second data are reserved and plural destinations are stored for each of the transmissions of the first data and the second data, said control means effects the transmission of the first data and the transmission of the second data alternately, and
    wherein said control means is adapted, in a case where one of destinations of transmission of the first data is busy, to transmit the second data to one of destinations of transmission of the second data, and thereafter to effect transmission of the first data.

* * * * *

UNITED STATES PATENT AND TRADEMARK OFFICE
CERTIFICATE OF CORRECTION

PATENT NO. : 5,077,787
DATED : December 31, 1991
INVENTOR(S) : MASATOMO TAKAHASHI            Page 1 of 2

It is certified that error appears in the above-identified patent and that said Letters Patent is hereby corrected as shown below:

On the title page:

AT [19] UNITED STATES PATENT

"Masatomo" should read --Takahashi--.

AT [56] REFERENCES CITED

"Zzawa et al." shoulds read --Izawa et al.--.

COLUMN 5

Line 4, "pointer" should read --pointers--.

COLUMN 6

Line 8, "In the" should read --The--.
Line 56, "palling" should read --polling--.

COLUMN 7

Line 15, "Data Communication Apparatus" should read
--A data communication apparatus--.
Line 18, "data transmission;" should read
--data transmission; and--.
Line 24, "designation" should read --destination--.

UNITED STATES PATENT AND TRADEMARK OFFICE
CERTIFICATE OF CORRECTION

PATENT NO. : 5,077,787
DATED : December 31, 1991
INVENTOR(S) : MASATOMO TAKAHASHI Page 2 of 2

It is certified that error appears in the above-identified patent and that said Letters Patent is hereby corrected as shown below:

COLUMN 8

Line 15, "transmission" should read --transmissions--.
Line 30, "transmissions" should read --transmission--.

Signed and Sealed this

Thirteenth Day of October, 1992

Attest:

DOUGLAS B. COMER

Attesting Officer

Acting Commissioner of Patents and Trademarks